J. G. MORTON.
WAGON-BRAKE LEVER.
No. 186,489. Patented Jan. 23, 1877.
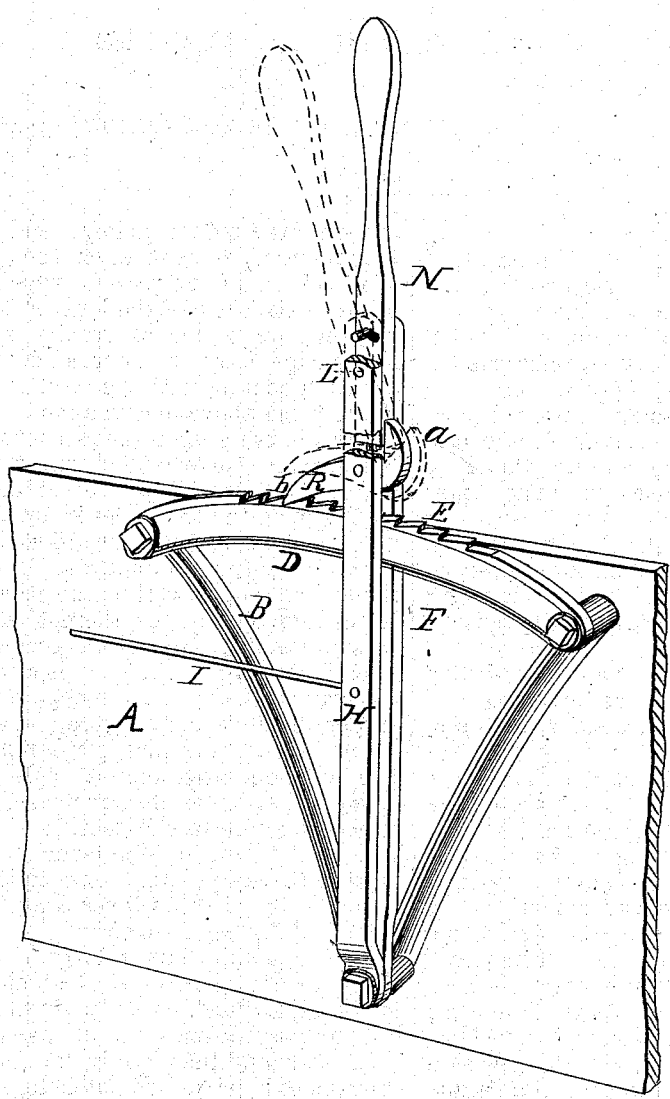

UNITED STATES PATENT OFFICE.

JAMES G. MORTON, OF CANTON, MO., ASSIGNOR OF ONE-HALF HIS RIGHT TO THOMAS J. MORTON AND JACOB HEITHER, JR., OF SAME PLACE.

IMPROVEMENT IN WAGON-BRAKE LEVERS.

Specification forming part of Letters Patent No. 186,489, dated January 23, 1877; application filed November 1, 1876.

*To all whom it may concern:*

Be it known that I, JAMES G. MORTON, of Canton, in the county of Lewis and State of Missouri, have invented a new and useful Improvement in Pawls and Ratchets, of which the following is a specification, reference being had to the accompanying drawings.

The invention relates to an improved pawl and ratchet, and, in the present instance, is shown as applied to a wagon-brake, though it is clear that it may be used in many other connections.

The purpose of the invention is to supply a ratchet with a pawl controlled by a lever, so that the pawl may be tilted and the lever allowed to move in the direction of the tension or strain on the draw-rod.

Figure 1 is a perspective view of a device embodying the elements of the invention.

In the accompanying drawings, A represents the vertical side of a wagon-body, to which is secured the bracket B, at the upper ends of which are secured the ends of the curved bar D, having at the apex of its curve the ratchet E, the bar being raised or separated from the side of the wagon-body a suitable distance by the interposed bracket, at the point of which is pivoted the lower end of the double tension-lever F, secured, as to its parts, by the bolt H, which serves to attach the rear end of the draw-rod I to the tension-lever, which, above the bolt, incloses the curved bar D, one portion of the lever being on each side thereof, and both extending a suitable distance above the same, and having at their upper extremity the guide-pin L passing through the transverse slot of the tilting-lever N, which projects above the upper ends of the tension-lever a suitable distance, and near its lower extremity is pivoted by the bolt P between the sides thereof. The lower end of the lever N is rounded, so as to enter the concavity in the tongue *a* of the pawl R, which is pivoted between the sides of the lever F in such manner that its center of gravity is toward its biting-edge *b*, which is curved downward and comes in contact with the ratchet E.

From the above construction it is plain that the pawl acting upon the ratchet will prevent the forward movement of the tension-lever, and that the tension can be at once relieved by throwing the tilting lever forward, as this gives its lower end a backward movement, and thus it, coming in contact with the curved portion of the tongue *a*, tilts the pawl R and releases the biting-edge thereof, allowing the tension-lever to move or be thrown forward. The biting-edge of the pawl is always in contact with the ratchet in an engaging position, except when elevated by the operation of the tilting lever. It is also plain that the lever N may be operated upon a single pivot.

What I claim as my invention, and desire to secure by Letters Patent, is—

1. The double tension-lever F, having the pawl R loosely pivoted between its parts, in combination with the lever N and ratchet E, substantially as set forth.

2. The double tension-lever F, having the tilting lever N and pawl R pivoted between its parts, in combination with the ratchet E and draw-rod I, substantially as specified.

In testimony that I claim the foregoing improvement in pawls and ratchets, as above described, I have hereunto set my hand this 9th day of October, 1876.

JAMES G. MORTON.

Witnesses:
THOMAS LILLARD,
A. BOLSER.